US012759405B2

(12) United States Patent
Arya et al.

(10) Patent No.: US 12,759,405 B2
(45) Date of Patent: Oct. 13, 2026

(54) HIGH-VOLTAGE COMPONENT AND METHODS OF USE

(71) Applicant: VOLVO TRUCK CORPORATION, Gothenburg (SE)

(72) Inventors: Pranav Arya, Gothenburg (SE); Ricard Blanc, Mölndal (SE); Toni Cacic, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/036,513

(22) Filed: Jan. 24, 2025

(65) Prior Publication Data

US 2025/0249751 A1 Aug. 7, 2025

(30) Foreign Application Priority Data

Feb. 1, 2024 (SE) .................................... 2450109-0

(51) Int. Cl.
*B60L 58/14* (2019.01)
*B60L 3/00* (2019.01)
*G07C 5/08* (2006.01)

(52) U.S. Cl.
CPC ........... *B60L 3/0053* (2013.01); *B60L 3/0046* (2013.01); *G07C 5/0808* (2013.01)

(58) Field of Classification Search
CPC .... B60L 3/0053; B60L 3/0046; G07C 5/0808
See application file for complete search history.

(56) References Cited

U.S. PATENT DOCUMENTS 12,224,604 B2 * 2/2025 Zhu ........................ H02J 7/0019
2009/0073624 A1 3/2009 Scholer et al.
2009/0134841 A1 * 5/2009 Gilmore .............. H01M 10/482 320/136

(Continued)

FOREIGN PATENT DOCUMENTS

CN 106828107 B 2/2023
CN 117067916 A 11/2023

OTHER PUBLICATIONS

Swedish Office Action and Search Report in corresponding Swedish Application No. 2450109-0 dated Aug. 7, 2024 (11 pages).

*Primary Examiner* — Ryan Johnson
*Assistant Examiner* — Esayas G Yeshaw
(74) *Attorney, Agent, or Firm* — Jeffri A. Kaminski; Venable LLP

(57) ABSTRACT

A high-voltage component and a method of use are provided for an electric, fuel cell, or hybrid vehicle. The HV component is reconfigurable to be included in a centralized HVIL system or in a de-centralized HVIL system. The HV component comprises an internal Hazardous Voltage Interlock Loop system configured to detect an internal HVIL fault; a first relay element configured to enable or disable the HV component; a second relay element configured to be opened to inform a vehicle electronic control unit about the internal HVIL fault; and an HVIL logic unit that is configured to be enabled, when the HV component is reconfigured for the centralized HVIL system, or completely or partially disabled, when the HV component is reconfigured for the de-centralized HVIL system. The first relay element may be opened with a delay after an internal HVIL fault or an external HVIL fault is detected.

16 Claims, 8 Drawing Sheets

(56) References Cited

U.S. PATENT DOCUMENTS

| | | | | |
|---|---|---|---|---|
| 2013/0278191 | A1* | 10/2013 | Zushi | H02H 7/122 318/400.22 |
| 2014/0062180 | A1 | 3/2014 | Demmerle et al. | |
| 2019/0128948 | A1 | 5/2019 | Smith et al. | |
| 2019/0184835 | A1 | 6/2019 | Karlsson | |
| 2021/0104902 | A1* | 4/2021 | Yamauchi | B60L 58/21 |
| 2022/0001747 | A1 | 1/2022 | Nyström | |
| 2024/0072551 | A1* | 2/2024 | Brodbeck | B60L 3/04 |
| 2025/0121684 | A1* | 4/2025 | Boyd | B60L 3/0023 |
| 2025/0128605 | A1* | 4/2025 | Thompson | B60L 3/04 |

* cited by examiner

HIGH-VOLTAGE COMPONENT AND METHODS OF USE

TECHNICAL FIELD

The disclosure relates generally to a reconfigurable high-voltage (HV) component that may be interchangeably used in a high-voltage, or hazardous voltage, interlock loop (HVIL) systems of different configurations.

The disclosure can be applied in heavy-duty vehicles, such as trucks, buses, and construction equipment, as well as in gensets.

BACKGROUND

In systems in which electrical current is transmitted through circuits, such as, e.g., electric and hybrid electric vehicles, a hazardous voltage interlock loop (HVIL) system may be used that provides a safeguard for service personnel and any other user of the vehicle from the danger of contact with elements of high-power electrical devices and components. A high-voltage (HV) component, also referred to as a traction voltage component, that is producing or consuming power/current, may have physical barriers such as e.g. a lid, a lock, an access cover, a shell, or any type of an enclosure that is designed, among other functions, to protect a person who may come into contact with the HV component. An internal HVIL system, also referred to sometimes as an HVIL loop, uses a signal detection circuit e.g. a low-voltage circuit or loop, having a signal circulating therethrough to detect when a continuity or integrity of the signal is interrupted, to thereby monitor the integrity of a high-voltage circuit of the HV component. For example, when a cover of a HV component is open, a low-voltage loop of the component's internal HVIL is thereby breached, which in turn causes a flow of a HV current through the component to be stopped before access to the HV component is permitted.

An HVIL system may be implemented in different ways, depending on an application. For example, in a so-called de-centralized HVIL system, each HV component inside a vehicle, a construction machine, or an auxiliary power supply monitors its internal HVIL system and reports to an external control unit. In a so-called centralized HVIL system, each HV component inside a vehicle, a construction machine, or an auxiliary power supply is part of an external HVIL system which is monitored by an external control unit. Thus, a HV component may be of a type that fits the centralized HVIL system. Another type of a HV component is used in vehicles deploying a de-centralized HVIL system. Accordingly, manufacturing multiple types of HV components is required for applications employing different HVIL systems.

SUMMARY

Aspects of the present disclosure relate to implementation of a hazardous voltage interlock loop (HVIL) system, also referred to as a high-voltage interlock loop (HVIL) system. The present disclosure addresses the challenge for a high-voltage component supplier to make a HV component such that the same type of the HV component, i.e. hardware with a single part number, can be used in multiple applications. An example of the HV component is a fuel cell system for an electric or hybrid fuel cell vehicle, though the examples of the present disclosure apply to any other HV component that can utilize an HVIL system.

A high-voltage or traction voltage component in accordance with examples of the present disclosure is reconfigurable to fit a vehicle implementing a centralized HVIL system in which an internal HVIL system of the HV component forms part of an external, centralized HVIL system, such that the HV component becomes aware of a breach on its own internal HVIL system and of a breach on an internal HVIL system of any other of the HV components in the HVIL system. The HV component is also reconfigurable such that it may be used in a vehicle implementing a de-centralized HVIL system in which an internal HVIL system monitors integrity of a low-voltage circuit, reports faults to an external control unit, and receives instructions from the external control unit regarding the faults. Accordingly, the same type of an HV component may be used in multiple applications, regardless of whether an application deploys a centralized HVIL system or a de-centralized HVIL system. As used herein, the application refers to a vehicle, a construction machine, an auxiliary power supply, or to any other device or system that relies on an HVIL system for safety. In this way, the same hardware component, i.e. the HV component in accordance with examples of the present disclosure, may advantageously be used for applications deploying different types of HVIL systems.

In an aspect, a high-voltage component for a vehicle is provided that comprises an internal Hazardous Voltage Interlock Loop (HVIL) system unit, a first relay element, a second relay element, and an HVIL logic unit. The internal HVIL system unit comprises a signal continuity detection circuit and it is configured to detect a breach of continuity of a signal in the signal continuity detection circuit as an internal HVIL fault and to output information on the internal HVIL fault as an internal HVIL fault signal. The first relay element is configured to move from a closed first relay element configuration to an open first relay element configuration to thereby disable the HV component. The second relay element is configured to be positioned in an external HVIL signal communication path that is connectable to an external HVIL system, the second relay element being configured to move from a closed second relay element configuration to an open second relay element configuration to thereby inform a vehicle electronic control unit (ECU) of the internal HVIL fault. The HVIL logic unit comprises an HVIL fault response control function and is configured to be enabled or partially disabled. The HVIL logic unit is configured to, when enabled, use the HVIL fault response control function to, responsive to receiving the internal HVIL fault signal from the HVIL system unit, after a first delay period, control the second relay element to move to the open second relay element configuration to thereby inform the vehicle ECU of the internal HVIL fault and, after a second delay period, control the first relay element to move to the open first relay element configuration to thereby disable the HV component; and, responsive to receiving, via the external HVIL signal communication path, an external HVIL fault signal informing the HVIL logic unit of an external HVIL fault, after a third delay period, control the first relay element to move to the open first relay element configuration to thereby disable the HV component.

The technical benefits include allowing manufacture and use in a vehicle of a HV component that fits either a vehicle with a centralized HVIL system or a vehicle with a de-centralized HVIL system. The HV component may be in the form of a hardware part that may be used, without changes to the hardware, in either the centralized HVIL system or the de-centralized HVIL system. The reconfiguring of the HV component may involve configuring or reconfiguring one or more parameters of the HVIL logic function such that the HVIL logic function may be either enabled when the HV component is used in the centralized HVIL system or at least partially disabled when the HV component is used in the de-centralized HVIL system. The manufacture and use of the same HV component that can fit either the centralized or de-centralized HVIL system saves production, service, and maintenance costs and time. Furthermore, in case of a fuel cell system (FCS) which is used in fuel cell electric vehicles (FCEV), the implementation of the FCS in accordance with examples of the present disclosure allows a FCS supplier to keep the same hardware solution for the FCS that fits multiple applications.

In some examples, the HVIL logic unit may be configured to be included in a HV component control unit.

In some examples, the second delay period may depend on at least one of an operating mode of the vehicle and a type of the HV component.

In some examples, when the operating mode of the vehicle comprises a standing mode, the second delay period may be shorter than when the operating mode of the vehicle comprises a moving mode.

In some examples, the second delay period may be longer than the first delay period.

In some examples, the third delay period may depend on at least one of an operating mode of the vehicle and a type of the HV component.

In some examples, when the operating mode of the vehicle comprises a standing mode, the third delay period may be shorter than when the operating mode of the vehicle comprises a moving mode.

Accordingly, the HV component in accordance with examples of the present disclosure advantageously allows controlling the timing, such as delayed opening, or not opening of the first relay element configured to be controlled to enable or disable the HV component. The delayed reaction, or reactivity, in accordance with examples of the present disclosure, can help extend the lifetime of the HV component.

In some examples, the HV component may comprise an HV component control unit that is configured to, when the HVIL logic unit is completely or partially disabled, generate and send, to a vehicle master controller of the vehicle, a message informing the vehicle master controller of the internal HVIL fault signal. In some examples, the HV component control unit may be configured to receive, in response to the message, an instruction from the vehicle master controller, regarding an action responsive to the internal HVIL fault signal.

In some examples, the HV component may comprise a first current detector configured to be coupled to the external HVIL signal communication path to detect the external HVIL fault and to provide the external HVIL fault signal to the HVIL logic unit of the HV component.

In some examples, the HV component is reconfigurable to be included in a centralized HVIL system and reconfigurable to be included in a de-centralized HVIL system, wherein the HVIL logic unit is enabled when the HV component is reconfigured to be connected to the centralized HVIL system and the HVIL logic unit is partially or completely disabled when the HV component is reconfigured to be connected to the de-centralized HVIL system.

In some examples, the HV component comprises a fuel cell system.

In some aspects, a HV component assembly is provided that comprises at least one HV component in accordance with examples of the present disclosure.

In some aspects, the HV component assembly may comprise an external HVIL system comprising an external signal continuity detection system configured to be communicatively coupled, via an external HVIL signal communication path, to a corresponding HVIL logic unit of each of the at least one HV component, whereby an HVIL fault on any HV component of the at least one HV component is communicated to all other HV components of the at least one HV component.

In some aspects, a vehicle is provided that comprises at least one HV component in accordance with examples of the present disclosure. In some examples, the vehicle may be, e.g., a fuel cell electric vehicle (FCEV). The FCEV may comprise at least one HV component comprising a fuel cell system.

In some aspects, a vehicle is provided that comprises at least one HV component assembly in accordance with examples of the present disclosure. In some examples, the vehicle may be, e.g., a FCEV. The FCEV may comprise at least one HV component comprising a fuel cell system.

In some aspects, a method is provided for configuring a HV component for a vehicle, the HV component comprising an internal HVIL system unit configured to detect an internal HVIL fault and to output information on the internal HVIL fault as an internal HVIL fault signal. The method comprises configuring the HV component so as to enable an HVIL fault response control function of an HVIL logic unit of the HV component, wherein the HVIL logic unit is configured to be enabled or at least partially disabled. The HV component further comprises a first relay element configured to move from a closed first relay element configuration to an open first relay element configuration to thereby disable the HV component; and a second relay element configured to be positioned in an external HVIL signal communication path that is connectable to an external HVIL system, the second relay element being configured to move from a closed second relay element configuration to an open second relay element configuration to thereby inform a vehicle ECU of the internal HVIL fault. The enabling of the HVIL fault response control function causes the HVIL logic unit to be able to, responsive to receiving the internal HVIL fault signal from the HVIL system unit, after a first delay period, control the second relay element to move to the open second relay element configuration to thereby inform the vehicle ECU of the internal HVIL fault and, after a second delay period, control the first relay element to move to the open first relay element configuration to thereby disable the HV component; and, responsive to receiving, via the external HVIL signal communication path, an external HVIL fault signal informing the HVIL logic unit of an external HVIL fault, after a third delay period, control the first relay element to move to the open first relay element configuration to thereby disable the HV component.

In some aspects, a method is provided for configuring a HV component for a vehicle, the HV component comprising an internal HVIL system unit configured to detect an internal HVIL fault and to output information on the internal HVIL fault as an internal HVIL fault signal. The method comprises configuring the HV component so as to disable an HVIL fault response control function of an HVIL logic of the HV component. The HVIL logic unit is configured to be enabled or at least partially disabled. The HV component further comprises a first relay element configured to move from a closed first relay element configuration to an open first relay element configuration to thereby disable the HV component; and a second relay element configured to be positioned in an external HVIL signal communication path that is connectable to an external HVIL system, the second relay element being configured to move from a closed second relay element configuration to an open second relay element configuration to thereby inform a vehicle ECU of the internal HVIL fault.

In some examples, the HV component may be configured to, when the HVIL logic unit is completely or partially disabled, generate and send, to a vehicle master controller of the vehicle, a message informing the vehicle master controller of the internal HVIL fault signal; and receive, in response to the message, an instruction from the vehicle master controller, regarding an action responsive to the internal HVIL fault signal.

In some examples, a method is provided that further comprises removing the HV component from a vehicle employing a centralized HVIL system, reconfiguring the HV component to be suitable for a de-centralized HVIL system, and installing the reconfigured HV component on a vehicle with the de-centralized HVIL system.

In some examples, a method is provided that further comprises removing the HV component from a vehicle employing a de-centralized HVIL system, reconfiguring the HV component to be suitable for a centralized HVIL system, and installing the reconfigured HV component on a vehicle with the centralized HVIL system.

Additional features and advantages are disclosed in the following description, claims, and drawings. Furthermore, additional advantages will be readily apparent from the present disclosure to those skilled in the art or recognized by practicing the disclosure as described herein. There are also disclosed herein control units, computer program products, and computer-readable media associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Figure 1A:
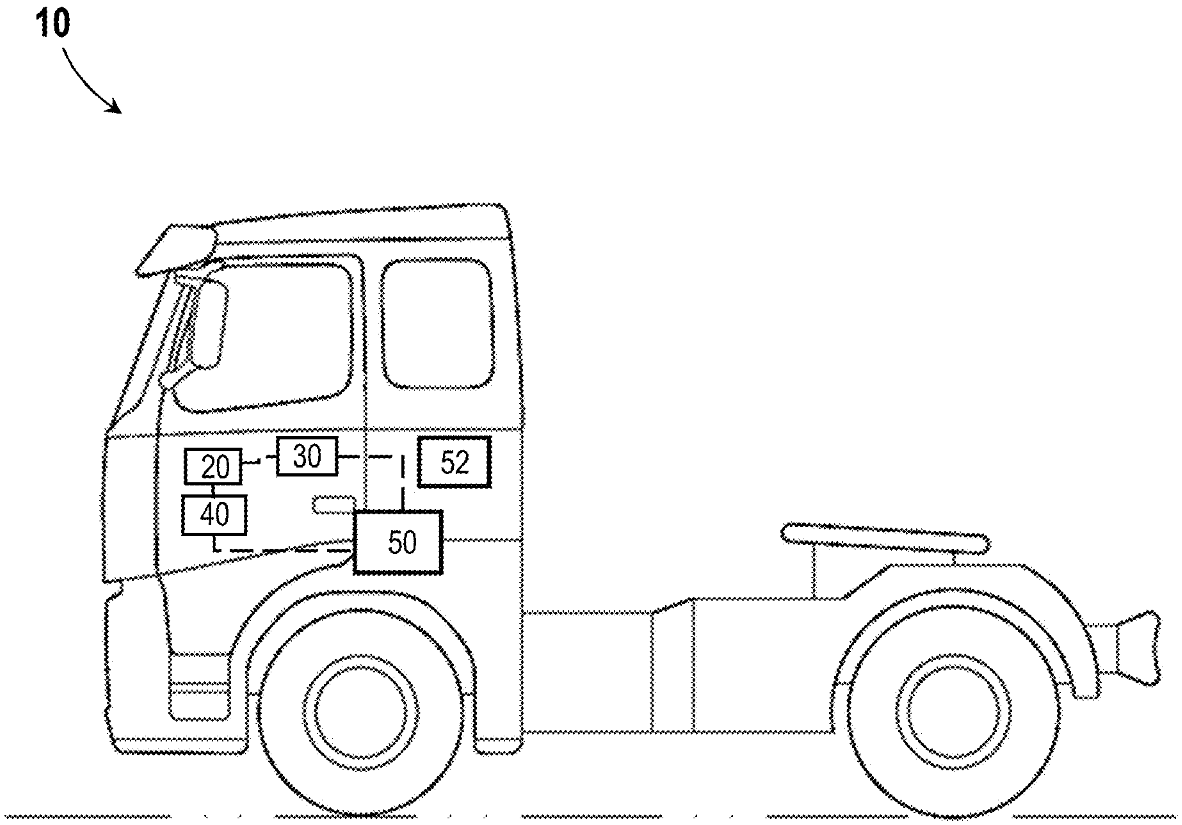
FIG. 1A illustrates a side view of an example of a vehicle which employs a centralized HVIL system.

A vehicle such as, e.g., a fuel cell vehicle, an electric vehicle, or a hybrid vehicle, includes multiple traction voltage components, also interchangeably referred to herein as high-voltage (HV) components. The vehicle with HV components typically employs a hazardous voltage interlock loop (HVIL) system, which provides a safety functionality that protects people during assembly, repair, maintenance and operation of the vehicle. The HVIL system comprises a low-voltage loop or circuit that monitors HV components such that, if a low-voltage HVIL signal on the low-voltage circuit is interrupted, this indicates that there is an issue with a high-voltage system of one or more of the HV components.

As used herein, a high-voltage (HV) component refers to an electric component or circuit that can operate in a voltage range of >60 V and ≤1500 V direct current (DC), or in a voltage range of >30 V and ≤1000 V alternating current (AC) root mean square (rms). The HV component may be a component classified as a voltage class "B" component according to ISO 6469-3. Non-limiting examples of HV components include a fuel cell system (FCS), a motor, a battery, a heater, a junction box, an inverter, a DC/DC converter, and any other type of a component that may operate in the voltage range as defined above. As used herein, low voltage refers to a voltage below 60 V DC or below 30 V AC.

When there is an attempt to access the HV component, for example, its protective cover or lid is opened, or a connector such as a plug is pulled out to disconnect the HV component from the vehicle, a continuity or integrity of a signal in a signal continuity detection circuit of a component's internal HVIL system may be breached, thereby indicating that current to the HV component needs to be interrupted. When a lid or a protective cover of the HV component is being open, there is a danger that a person can come in contact with hazardous voltage. In some cases, during a course of a repair or maintenance of the HV component, when e.g. unplugging an HV connector of the HV component, an electric arc effect may occur e.g. a loud flash which may startle a person such as e.g. a maintenance personnel. This may be dangerous when the person is working above the ground such as e.g. there is a risk of a fall. There is also a risk of burn because a temperature of the HV connector may become high enough to cause an injury. Also, the arc is hot and the heat from the arc i.e. the air gap can burn the person's skin.

The internal HVIL system of the HV component, and in some implementations an external HVIL system of the vehicle are thus designed so as to reduce a risk of the arc effect, in addition to preventing premature access to the HV component i.e. before power is interrupted.

In examples of the present disclosure, a HV component includes an HVIL logic unit that is configured to be enabled or at least partially disabled. When the HV component is included in a vehicle employing a centralized HVIL system, the HVIL logic unit may be enabled. When the HV component is included in a vehicle employing a de-centralized HVIL system, the HVIL logic unit may be completely or partially disabled, wherein a partial disablement means that one or more functions, e.g., an HVIL fault response control function, may be disabled. Enabling or disabling the HVIL fault response control function may involve respectively configuring a parameter or setting a flag in the HVIL logic unit, or otherwise configuring the HVIL logic unit. The enabling or disabling may be performed e.g. at manufacturing of the HV component or during its installation.

The entire HVIL logic unit may be disabled, i.e. completely disabled, in some implementations of the HV component in a de-centralized HVIL system.

The HV component in accordance with examples of the present disclosure may comprise relays or switches that can be enabled or disabled and which are controllable by the HVIL logic unit. A first relay or relay element is configured to control a low voltage power supply to enable or disable the HV component. In some examples, the low voltage power supply may be replaced by an analogue or a digital signal e.g. a controller area network (CAN) bus digital signal. In some examples, when the first relay element is closed, the HV component is allowed to start up or continue operation if it is already in operation. However, if the first relay element is open or opened, the HV component is disabled such that the HV component stops producing or consuming high-voltage current or power. The first relay element may be opened, e.g., moved to an open first relay element configuration, when an internal HVIL fault is detected or when an HVIL fault is detected outside of the HV component i.e. it is an HVIL fault that has occurred on another HV component in a vehicle HVIL loop or circuit of an external HVIL system.

A second relay or relay element is configured to be positioned in an external HVIL signal communication path, otherwise referred to as a vehicle HVIL loop, that is connectable to an external HVIL system. In case an internal HVIL fault is detected in the internal HVIL system of the HV component, the HVIL logic unit will control or trigger the second relay element to open to thereby signal the vehicle, e.g., a vehicle electronic control unit (ECU), about the internal HVIL fault.

In some examples, a breach of continuity of a signal in the signal continuity detection circuit of the internal HVIL system unit is detected as an internal HVIL fault, which may be reported, to the HVIL logic unit, as an internal HVIL fault signal. In examples in accordance with the present disclosure, the HVIL logic unit, e.g., the HVIL fault response control function of the HVIL logic unit, is configured to, responsive to receiving an internal HVIL fault signal from the HVIL system unit, after a first delay period, control the second relay element to move to the open second relay element configuration to thereby inform the vehicle ECU of the internal HVIL fault and, after a second delay period, control the first relay element to move to the open first relay element configuration to thereby disable the HV component.

Thus, the second relay element may be opened after the first delay period from a time when the internal HVIL fault is detected, whereas the first relay element may be opened after the second delay period from the time when the internal HVIL fault is detected. The difference between the first delay period and the second delay period may be small e.g. close or zero, or it may be larger, depending on at least one of an operating mode of the vehicle and a type of the HV component. In some examples, the second delay period may be longer than the first delay period, such that, for example, the second relay element may be used to inform the vehicle, e.g. a vehicle driver or a suitable system of the vehicle of the internal HVIL fault before the actual stopping of the HV component. In some examples, an indicator e.g., an alarm or another indicator may be generated or triggered responsive to the internal HVIL fault in the HV component. For example, an indicator may be displayed on a dashboard of the vehicle, to inform the driver of the fault on the HV component and/or to warn the driver of the upcoming shutdown of the HV component. The triggered indicator may be in a visual, audio, or in any other form.

In some examples, the second delay period may depend on at least one of an operating mode of the vehicle and a type of the HV component. In some examples, when the operating mode of the vehicle comprises a standing mode, the second delay period may be shorter than when the operating mode of the vehicle comprises a moving mode.

In some examples, the HVIL logic unit, e.g., the HVIL fault response control function is configured to, responsive to receiving, via the external HVIL signal communication path, an external HVIL fault signal informing the HVIL logic unit of an external HVIL fault, after a third delay period, control the first relay element to move to the open first relay element configuration to thereby disable the HV component. In other words, the HV component may be disabled or inactivated or shut down responsive to detection of an external HVIL fault, which may be an internal HVIL fault on another HV component. In a centralized HVIL system, more than one, e.g., ten or more in some cases, HV components may be included in the HVIL loop such that an HVIL fault in any of the components is detected by the rest of the components. Similar to the case of the HV component's internal HVIL fault, the HV component may be disabled with a certain delay, referred to herein as the third delay period, relative to a time when the external HVIL fault has occurred. In some examples, the third delay period may depend on at least one of an operating mode of the vehicle and a type of the HV component. In some examples, when the operating mode of the vehicle comprises a standing mode, the third delay period may be shorter than when the operating mode of the vehicle comprises a moving mode.

In some examples, the third delay period may be similar to the second delay period.

For example, a hazard may be different when an attempt to access a HV component takes place while the vehicle is standing still, as compared to a situation when the vehicle is moving at a certain speed. When the vehicle is standing still, upon the attempt to access the HV component, the current/power from or to the HV component needs to be reduced fast, i.e. in the order of a few tens of milliseconds (ms), to minimize the hazard of arcing due to braking the current, which can injure the service personnel or nearby persons. On the other hand, while the vehicle is moving, the risk of injury may be lower, because a person is not near the HV component, and thus a delayed reaction to reduce the current/power can be acceptable. Also, it may be required, e.g., that the vehicle moves to a certain location before the HV component may be disabled. In various circumstances, it may be acceptable to delay a disabling of the HV component even if an internal HVIL fault is detected. Also, the delay in disabling the HV component may depend on a type of the HV component, e.g., whether it is a battery, brakes, a fan, an air conditioner, etc. For example, for obvious reasons, the brakes cannot be disabled immediately when the vehicle is moving. A battery may be shut down only after all the loads on the battery are shut down.

Accordingly, the HV component and a method of use thereof, in accordance with examples of the present disclosure advantageously allow controlling the timing, such as delayed opening, or not opening of the first relay element configured to be controlled to enable or disable the HV component. The delayed reaction, or reactivity, in accordance with examples of the present disclosure, can help extend the lifetime of the HV component.

Accordingly, aspects in accordance with examples of the present disclosure provide a traction voltage or HV component that is reconfigurable to be included in a centralized HVIL system and reconfigurable to be included in a de-centralized HVIL system.

FIG. 1A depicts a side view of a vehicle 10 in which examples of the present disclosure may be implemented. The vehicle 10 is shown as a truck, such as a heavy-duty truck for towing one or more trailers (not shown). The vehicle 10 may be an electric vehicle, e.g., a fuel cell electric vehicle (FCEV) or a hybrid vehicle. It should be appreciated that the present disclosure is not limited to any specific type of vehicle, and may be used for any other type of vehicle, such as a bus, construction equipment, e.g. a wheel loader or an excavator, a passenger car, an aircraft, and a marine vessel. The present disclosure is also applicable for other applications not relating to vehicles, including stationary applications.

FIG. 1A schematically illustrates an example of the vehicle 10 comprising a centralized HVIL system comprising first, second, and third HV components 20, 30, 40. An internal HVIL system of each of the first, second, and third HV components 20, 30, 40 is part of an external HVIL system of the vehicle e.g. the centralized HVIL system which may be communicatively coupled to and/or controlled by a vehicle electronic control unit (ECU) 50. The ECU 50 may comprise components of the external HVIL system, e.g., an HVIL signal generator and an HVIL signal detector, as discussed in more detail below. The vehicle ECU 50 becomes aware of HVIL faults on each of the HV component's internal HVIL system, due to the nature of the configuration of the centralized HVIL system.

As also shown in FIG. 1A, the vehicle 10 comprises a vehicle master controller 52 that is configured to control the HV component. The HV component informs the master controller 52 of HVIL faults. For the sake of simplicity, connections between each of the first, second, and third HV components 20, 30, 40 and the vehicle master controller 52 are not shown in FIG. 1A, but it should be appreciated that the master controller 52 is communicatively coupled to each of the first, second, and third HV components 20, 30, 40, as well as to any other HV components of the vehicle 10 which are controllable by the master controller 52.

Figure 1B:
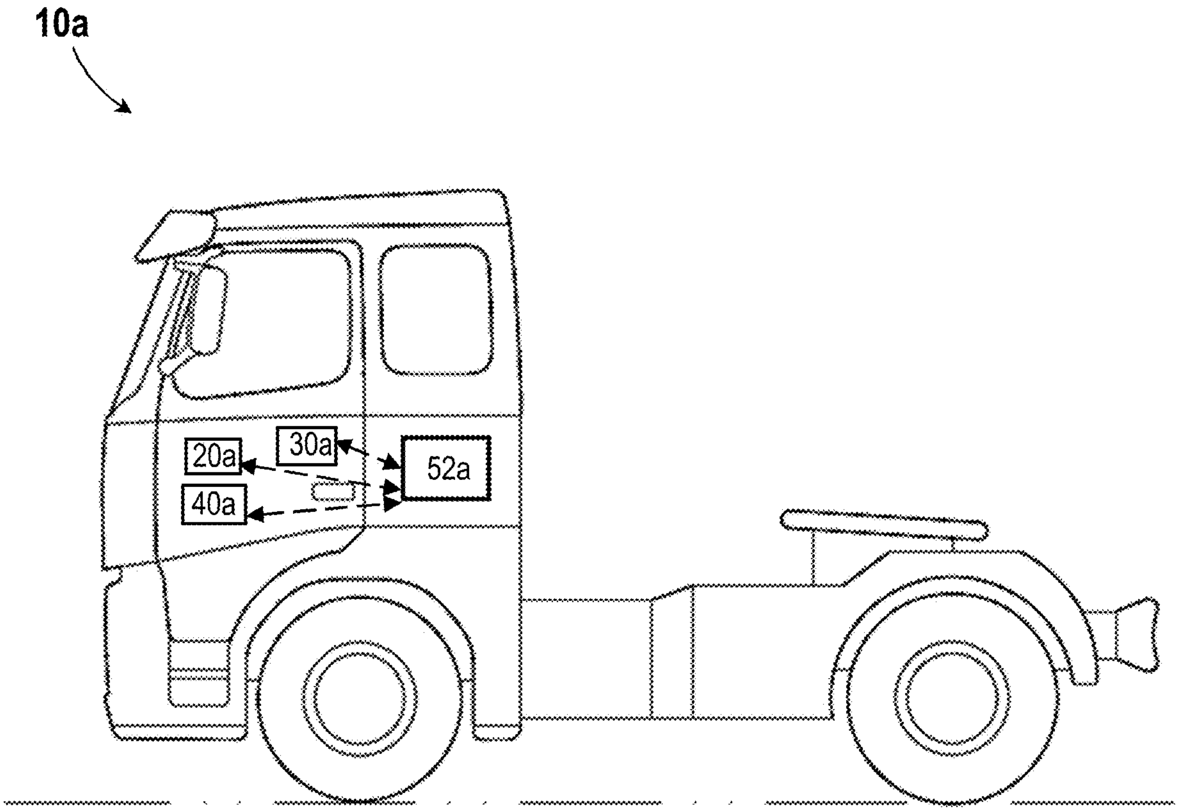
FIG. 1B illustrates a side view of an example of a vehicle which employs a de-centralized HVIL system.

FIG. 1B schematically illustrates an example of the vehicle 10*a* which may be similar to the vehicle 10 of FIG. 1A but which comprises a de-centralized HVIL system comprising first, second, and third HV components 20*a*, 30*a*, 40*a*. An internal HVIL system of each of the first, second, and third HV components 20*a*, 30*a*, 40*a* communicates HVIL faults on the internal HVIL system to a vehicle master controller 52*a*. The vehicle master controller 52*a* may instruct a HV component, e.g., each of the first, second, and third HV components 20*a*, 30*a*, 40*a*, regarding which action to take in response to the HVIL fault. The vehicle 10*a* does not include an ECU similar to the ECU 50 of FIG. 1A, because there is no centralized control of internal HVIL systems of the vehicle's HV components.

Figure 2:
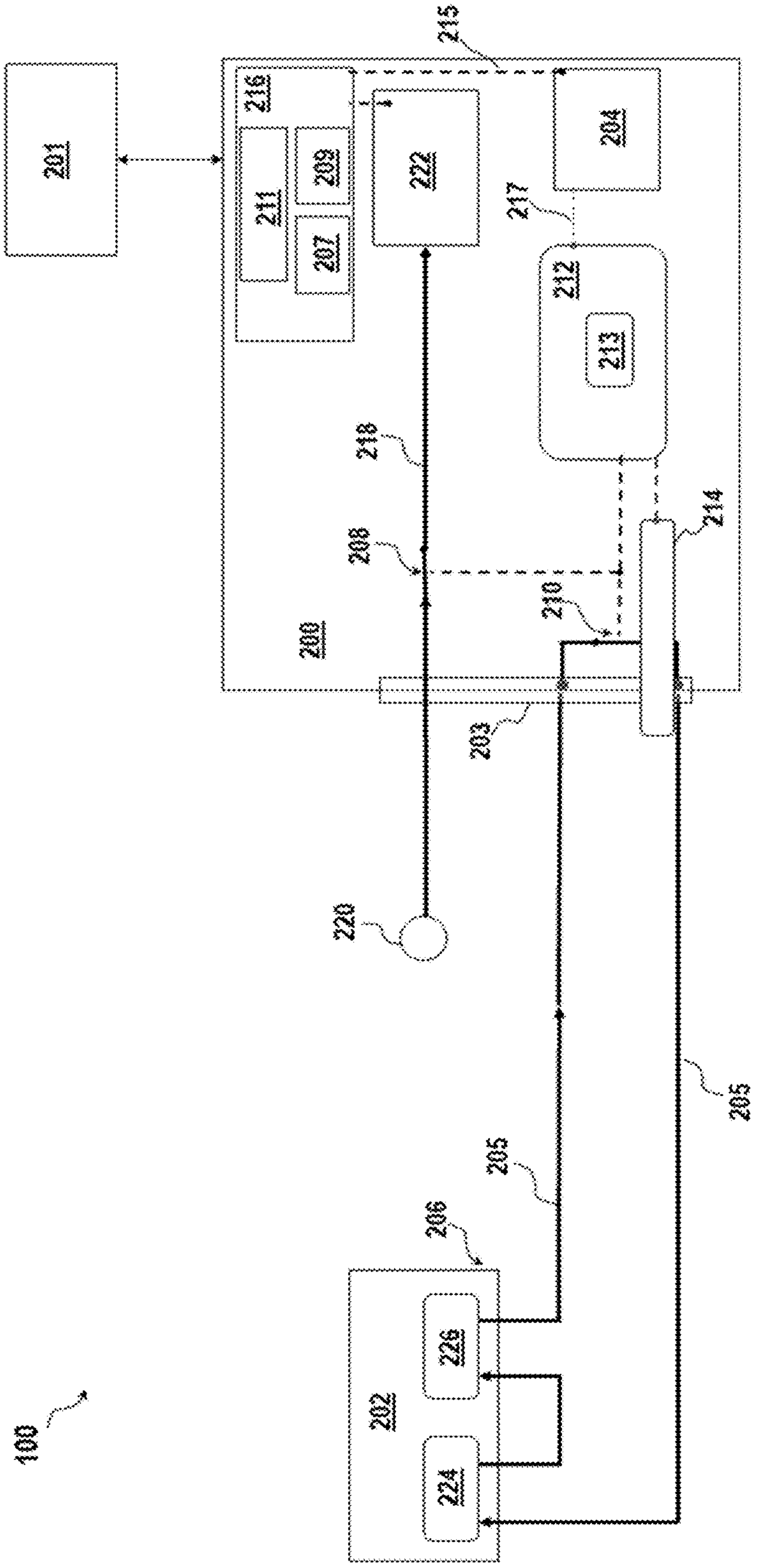
FIG. 2 is a block diagram illustrating an example of a vehicle comprising a HV component for a centralized HVIL system, during normal operating conditions, in accordance with examples of the present disclosure.

FIG. 2 illustrates in more detail an example of a vehicle 100 that employs a centralized HVIL system, wherein the vehicle 100 of FIG. 2 may be similar to e.g. vehicle 10 of FIG. 1A. As shown in FIG. 2, the vehicle 100 comprises a HV component 200 that is communicatively coupled with a vehicle ECU 202 and with a vehicle main controller 201, also referred to herein as a vehicle master controller, of the vehicle 100. The HV component 200 may be e.g. any of first, second, and third HV components 20, 30, 40 of FIG. 1A, or any other HV component. The vehicle ECU 202 may be similar to vehicle ECU 50 of FIG. 1A. In some examples, the vehicle 100 may be a fuel cell vehicle and the HV component 200 may comprise a fuel cell system (FCS). In some examples, the HV component 200 may be a motor, a battery, an inverter, an adapter, an air conditioner, or any other HV component. The HV component 200 may be any suitable component that can produce and/or consume HV current and/or power.

Although not shown in FIG. 2, the vehicle master controller 201 comprises processing circuitry, memory e.g. a computer-readable storage device, and an input and output interface configured to communicate with the HV component 200 and other components of the vehicle. The input and output interface may comprise a wireless and/or wired receiver and a wireless and/or wired transmitter. In some examples, the input and output interface may comprise a wireless and/or wired transceiver. The vehicle master controller 201 may use the input and output interface to communicate with and control the HV component 200 using any one or more out of a Controller Area Network (CAN) bus, ethernet cables, Wi-Fi, Bluetooth, and/or other network interfaces. The processing circuitry, e.g. one or more processors, may be configured to execute computer-executable instructions stored on the computer-readable storage device, to perform control of operation of the HV component 200, as well as other components of the vehicle 100, e.g., the vehicle ECU 202.

In FIG. 2, the HV component 200 is shown in normal operating conditions, when no HVIL fault is detected, i.e. neither an internal HVIL fault is detected nor an external HVIL fault is detected, as discussed below.

As shown in FIG. 2, the HV component 200 comprises an internal HVIL system unit 204 which is coupled to and/or part of an external HVIL system 206 of the vehicle 100. The HVIL system unit 204 comprises an internal signal continuity detection circuit (not shown in FIG. 2) and it is configured to detect a breach of continuity of a signal in the signal continuity detection circuit as an internal HVIL fault and to output information on the internal HVIL fault as an internal HVIL fault signal.

The external HVIL system 206 may be referred to as a centralized HVIL system because it is communicatively coupled to internal HVIL systems of one or more, typically multiple, HV components of the vehicle. In some examples, ten HV components may be part of an external HVIL system. In some examples, a vehicle may have more than one external HVIL system. The external HVIL system 206, together with the HV components' internal HVIL systems, forms a common, centralized system which is aware of a status, i.e. signal continuity of internal signal continuity detection circuits, of each of the respective HV components. Thus, as shown in FIG. 2, the external HVIL system 206 comprises and/or is connectable to an external HVIL signal communication path 205 that is communicatively coupled to the HV component 200. In the centralized HVIL system, the HV component 200, as well as one or more other HV components (not shown), are coupled to the external HVIL signal communication path 205, such that an HVIL fault on any of the HV components is also detected by all of the other HV components.

The external HVIL system 206 may be controlled by the vehicle ECU 202. The vehicle ECU 202 may comprise, in addition to components shown in FIG. 2, processing circuitry e.g. one or more processors, memory e.g. a computer-readable storage device, and an input and output interface configured to communicate with HV components coupled to or associated with the external HVIL system 206 including the HV component 200 components, as well as with other components of the vehicle such as the vehicle master controller 201. The ECU 202 may be or may comprise, e.g., a general-purpose processor, an application-specific processor, a circuit with processing components, a distributed group of processing components, a distributed group of computers configured for processing, a field programmable gate array (FPGA), or the like. The processing circuitry of the vehicle ECU 202 may be configured to execute computer-executable instructions stored on the computer-readable storage device of the vehicle ECU 202, to perform control of operation of the external HVIL system 206 comprising HV components including the HV component 200.

The HV component 200 also comprises a first switch or relay element 208, a second switch or relay element 210, an HVIL logic unit 212, a signal detector 214, and an HV component control unit 216. The HV component 200 may comprise other elements or components not shown herein. The HV component 200 also includes a signal communication interface 203, e.g. a low voltage communication interface in some examples, that is configured to provide a low voltage electrical connection between the HV component 200 and the external HVIL system. Other low voltage electrical connections for the HV component required for other functions such as for control and supplying power to the control units may be part of the signal communication interface 203.

The HV component control unit 216 is configured to communicate with the vehicle master controller 201 via e.g. a CAN, ethernet and/or another type of a communications network. Information on internal HVIL faults, as well as various other information, may be communicated to the vehicle master controller 201. The HV component control unit 216, as well as other units of the HV component 200, may receive commands from the vehicle master controller 201. The HV component control unit 216 is configured to communicate with the internal HVIL system unit 204, as shown schematically in FIG. 2 by a dotted line representing a communication path 215 between the HV component control unit 216 and the internal HVIL system unit 204. As also shown in FIG. 2, the internal HVIL system unit 204 may be configured to communicate with the HVIL logic unit 212 via a communication path 217. It should be noted that communication paths exist between other components or units of the HV component 200, some of which are shown in FIG. 2, as well as in other Figures herein, and that one of skill in the art would know how to implement such communication paths.

The first relay element 208 is positioned in a communication path 218 between a power supply 220, e.g., a low voltage power supply, and a HV enable logic unit 222. The first relay element 208 is configured to be controlled to thereby enable or disable the HV component 200, via controlling the HV enable logic unit 222. When the HV enable logic unit 222 is electrically coupled to the power supply 220, when the first relay element 208 is closed, the HV component 200 is enabled or continues to operate. If the first relay element 208 is triggered to open, the power supply to the HV enable logic unit 222 is interrupted which stops current from being supplied or received from the HV component 200.

The HV enable logic unit 222, as well as other components or units of the HV component 200, may be controlled by the HV component control unit 216.

In examples herein, the first relay element 208 is configured to move from a closed first relay element configuration to an open first relay element configuration to thereby disable the HV component 200. In FIG. 2, the first relay element 208 is shown in a closed configuration, i.e. no HVIL fault is detected either on the HV component 200 or outside of the HV component 200. The power supply 220 may be e.g. a low voltage 12 v/24 v power supply. In some examples, the power supply 220 may be an analogue or a digital signal e.g. control area network (CAN) power supply. Any other suitable power supply may be used.

In examples herein, when the first relay element 208 closes or is closed, the HV component 200 is allowed to start up or continue operation if the HV component 200 is already operating. Once the first relay element 208 is open or opened, the HV component 200 is disabled such that it stops producing or consuming HV current and/or power.

The second relay element 210 is configured to be positioned in the external HVIL signal communication path 205 that is connectable to the external HVIL system 206. The external HVIL signal communication path 205 may be considered to be part of the external HVIL system 206. The second relay element 210 is configured to move from a closed second relay element configuration to an open second relay element configuration to thereby inform the vehicle ECU 202 of the internal HVIL fault. When the internal HVIL fault is detected by the HVIL system unit 204, as the breach of continuity of the signal in the signal continuity detection circuit of the HVIL system unit 204, the second relay element 210 is open or opened, to thereby inform the vehicle ECU 202, and thus inform the external HVIL system 206. In FIG. 2, the second relay element 210 is shown as closed, since the configuration shown in FIG. 2 illustrates a scenario when no HVIL fault is present, and thus there is no need to inform the vehicle ECU 202 of a fault.

The HVIL logic unit 212 comprises an HVIL fault response control function 213 and is configured to be enabled, or completely or partially disabled. The HVIL logic unit 212 may be enabled when the HV component 200 is installed in a vehicle or another device employing a centralized HVIL system, e.g., as in the example of FIG. 2. The HVIL logic unit 212 may be disabled, completely or partially, when the HV component 200 is installed in a vehicle or another device employing a de-centralized HVIL system. In some examples, the HVIL logic unit 212 may comprise a computer-readable storage medium storing one or more parameters that may be configured to allow the HV component 200 to be installed in a centralized HVIL system or in a de-centralized HVIL system. As an example only, an enable/disable parameter may be configured in dependence on whether the HV component 200 is configured or reconfigured to be intended for a centralized HVIL system or for a de-centralized HVIL system. The enable/disable parameter may be set to a certain value, e.g., 0, to thereby disable the HVIL fault response control function 213 or the entire HVIL logic unit 212, and the enable/disable parameter may be set to another value, e.g., 1, to thereby enable the HVIL logic unit 212. The enable/disable parameter may be configured to be set to more than two alternative values. Another parameter may be used to allow configuring or reconfiguring the HVIL logic unit 212 so that the HV component can be installed in a centralized HVIL system or in a de-centralized HVIL system.

In some examples, the HVIL logic unit 212 and/or the HVIL fault response control function 213 may be implemented in firmware that may be reconfigurable in dependence on whether the HV component 200 is intended for a centralized HVIL system or for a de-centralized HVIL system.

The HVIL logic unit 212 is configured to, when it is enabled, use the HVIL fault response control function 213 to control or trigger the first relay element 208 to open, responsive to either an internal HVIL fault occurred within the HV component 200 or an external HVIL fault occurred outside the HV component i.e. in any of other HV components in the external HVIL system 206. The internal HVIL fault may be detected by the HVIL system unit 204 that communicates the internal HVIL fault, e.g. as the internal HVIL fault signal, to the HVIL logic unit 212. The internal HVIL fault is also communicated to the HV component control unit 216 that may, in turn, communicate the fault to the vehicle controller 201.

In some examples, the HVIL logic unit 212 may be part of the HV component control unit 216. In some examples, the HVIL logic unit 212 may be included in other units of the HV component 200.

When no HVIL fault is present, the signal detector 214, e.g. a current detector, coupled to the external HVIL signal communication path 205, also referred to as the vehicle HVIL loop, detects signal e.g. current, according to operating state of the HV component 200. The signal detector 214 may detect the external HVIL fault by detecting a change in a value of the signal in the path 205. For example, the signal detector 214 such as e.g. the current detector may detect the external HVIL fault when a value of the current in the external HVIL signal communication path is zero. The signal detector 214 is configured to communicate information about the external HVIL fault, e.g. as an external HVIL fault signal, to the HVIL logic unit 212. The signal detector 214 may be referred to as a first signal detector because the HVIL system unit 204 includes another, second signal detector configured to detect a value of a signal in the signal continuity detection circuit of the HVIL system unit 204, as shown in more detail in FIG. 3 discussed below.

The HVIL logic unit 212 is configured to, when enabled, use the HVIL fault response control function 213 to, responsive to receiving the internal HVIL fault signal from the HVIL system unit 204, after a first delay period, control the second relay element 210 to move to the open second relay element configuration to thereby inform the vehicle ECU 202 of the internal HVIL fault and, after a second delay period, control the first relay element 208 to move to the open first relay element configuration to thereby disable the HV component 200. The HVIL logic unit 212 is also configured to, when enabled, use the HVIL fault response control function 213 to, responsive to receiving, via the external HVIL signal communication path 205, the external HVIL fault signal informing the HVIL logic unit of the external HVIL fault, after a third delay period, control the first relay element 208 to move to the open first relay element configuration to thereby disable the HV component 200.

The vehicle control unit 202 comprising and/or controlling the external HVIL system 206, comprises an HVIL signal detector 224 and an HVIL signal generator 226. The HVIL signal generator 226, e.g., a current generator, is configured to generate a signal that is passed through the external HVIL signal communication path 205. The HVIL signal detector 224 is configured to detect a value of the signal in the external HVIL signal communication path 205. The signal detector 214 of the HV component 200 is also configured to detect the value of the signal in the path 205, so that the HV component 200 becomes informed of an HVIL fault that has occurred outside of the HV component 200.

The HV component control unit 216 is configured to control operation of the HV component 200, such as operation of the units of the HV component shown in FIG. 2, as well as of other units or components or elements of the HV component 200. For example, in examples in which the HV component 200 is a FCS, the HV component control unit 216 is also configured to control operation of one or more fuel cell stacks, as well as other components involved in production of energy or power by the FCS.

As shown by way of example in in FIG. 2, the HV component control unit 216 may comprise processing circuitry 207, memory 209 e.g. a computer-readable storage device, and at least one input and output interface 211 configured to communicate with other units of the HV component 200, e.g., the HVIL system unit 204 and HV enable logic unit 222, and with the vehicle. The input and output interface 211 may comprise a wireless and/or wired receiver and a wireless and/or wired transmitter. In some examples, the input and output interface 211 may comprise a wireless and/or wired transceiver. The HV component control unit 216 may use the input and output interface 211 to communicate with the vehicle master controller 201 using any one or more out of a Controller Area Network (CAN) bus, ethernet cables, Wi-Fi, Bluetooth, and/or other network interfaces. The processing circuitry 207, e.g. one or more processors, may be configured to execute computer-executable instructions stored on the computer-readable storage device 209, to perform control of operation of the HV component 200 and/or units or components included in the HV component 200.

Figure 3:
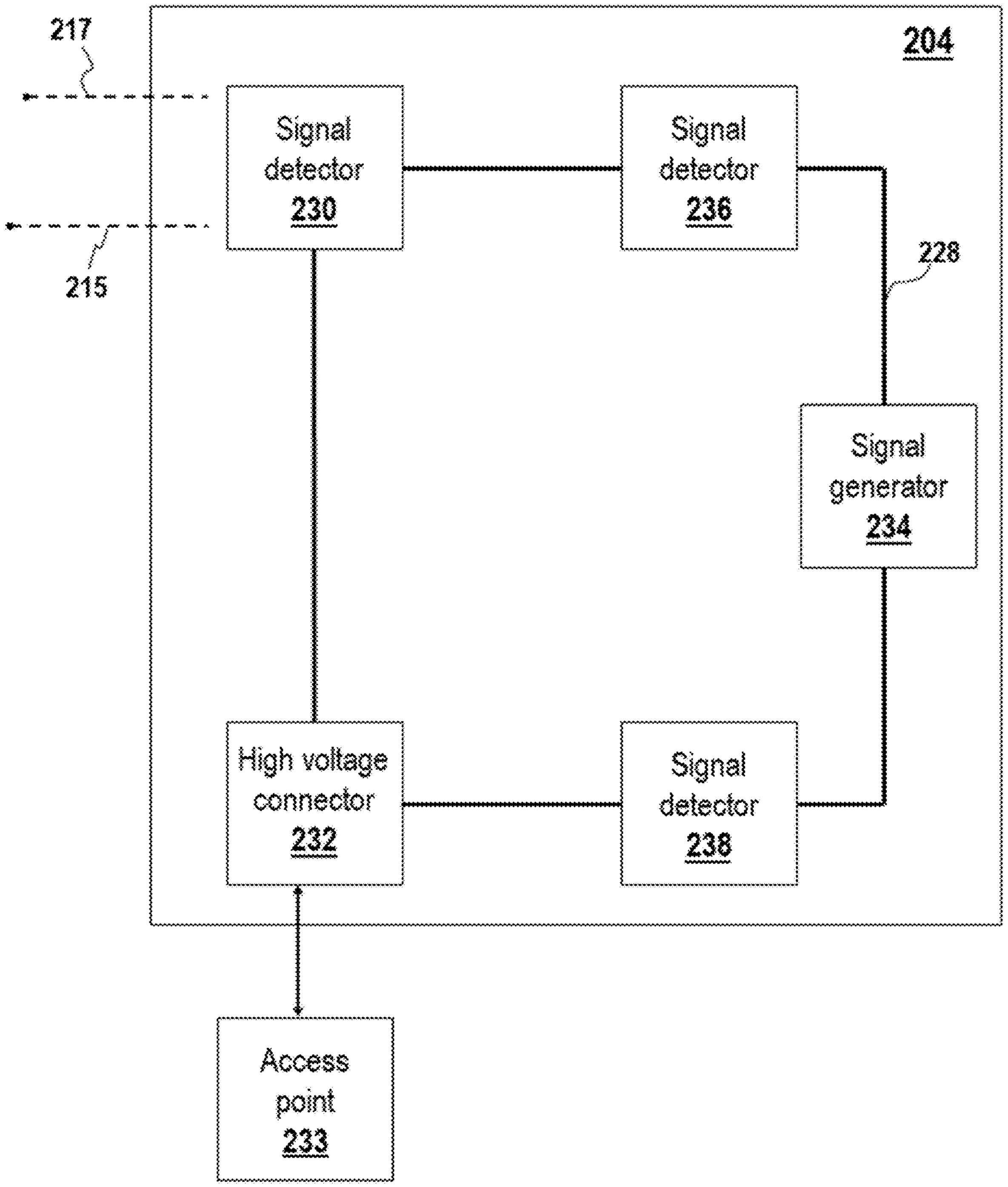
FIG. 3 is a block diagram illustrating an example of an internal HVIL system unit, in accordance with examples of the present disclosure.

FIG. 3 illustrates an example of an internal HVIL system e.g. internal HVIL system 204 of the HV component 200 shown in FIG. 2. As shown in FIG. 3, the internal HVIL system 204 may comprise an internal signal continuity detection circuit 228. The signal continuity detection circuit 228 comprises a signal detector 230, which may be referred to as a second signal detector, configured to detect a value of a signal in the signal continuity detection circuit 228, a high-voltage connector 232 that includes a signal path that is interrupted when a continuity of the signal in the signal continuity detection circuit is breached, and a signal generator 234 that generates a signal for the signal continuity detection circuit 228. When the HV component 200 is included in a vehicle in which a centralized HVIL system is deployed for ensuring safety of technicians and/or personnel standing near the vehicle, the external centralized HVIL system includes an additional signal generator, such as e.g. HVIL signal generator 226 shown in FIG. 2, that is configured to generate a signal that is pushed through external HVIL signal communication path 205.

In some examples, the signal in the signal continuity detection circuit 228 comprises current, the signal detector 230 comprises a current detector, and the signal generator 234 comprises a current generator. In some examples, the signal in the signal continuity detection circuit 228 comprises voltage, the signal detector 230 comprises a voltage detector, and the signal generator 234 comprises a voltage generator.

The signal generated by the signal generator 230 circulates through the signal continuity detection circuit 228, and an interruption of the continuity of the signal through the loop circuit is detected as an interruption or breach or fault on the signal continuity detection circuit 228. This indicates that the high-voltage connector 232, e.g. a pin, is disconnected, loose, or damaged. This is detected, as a signal drop, by both the signal detector 230 of the HV component 200 as well as by an HVIL signal detector 224 of the external HVIL system 206 shown in FIG. 2. The high-voltage connector 232 may comprise more than one high-voltage connectors.

The high-voltage connector 232 is configured to electrically and physically couple or mate the HV component 200 to the outside e.g. to a suitable component of the vehicle 100. As shown schematically in FIG. 2, the high-voltage connector 232 may comprise, may be included in, or may be associated with an access point or component 233 such as e.g. a housing, cover, lid, shell, or any enclosure that can be movable to allow gaining access to the HV component. Opening or other change in the configuration of the access point or component 233 may cause the high-voltage connector 232 to detect the breach of the continuity of the signal continuity detection circuit 228. In some examples, the access component 233 may be moved from a first e.g. closed configuration to a second e.g. open or at least partially open configuration, which may cause a breach of a signal continuity in the signal continuity detection circuit 228. As an example, the access component 233, e.g., a lid or cover, may be configured to block access to hazardous voltage, and the lid may include a signal switch or another suitable component configured to open or interrupt continuity of the signal continuity detection circuit 228 when the lid is open. The signal switch may be a mechanical switch, or a magnetic switch, or a switch of another suitable type. Regardless of its specific configuration, the switch or another similar feature may be configured to open or break or interrupt the continuity of the signal continuity detection circuit 228 when the lid is open. The access component 233 may have any suitable configuration and the HV component 200 may be enclosed within, at least partially covered by, or otherwise associated with the access component 233 that prevents premature access to the HV component 200 and to high-voltage power that may be passing through the component 200.

As shown in FIG. 3, the HV component 200 may optionally include at least one additional signal detector, shown by way of example as first and second additional signal detectors 236, 238 that are configured to detect a breach in the continuity of the signal in the signal continuity detection circuit 228. In a centralized HVIL system the first and second additional signal detectors 236, 238 may be used to determine which of HV components connected to the HVIL external system is causing the breach of the continuity of the signal. Thus, in a centralized HVIL system, the first and second additional signal detectors 236, 238, e.g., voltage detectors in some examples, may be used to detect that it is the HV component 200 on which an HVIL fault is present if such fault has occurred.

The internal HVIL system 204 is configured to communicate with other components or units of the HV component 200. Thus, as shown in FIG. 3, the internal HVIL system 204 may communicate with the HV component control unit 216 via the communication path 215, and the internal HVIL system 204 may communicate with the HVIL logic unit 212 via the communication path 217. The internal HVIL system 204 may communicate with other components or units of the HV component 200, via one or more communication paths. It should be noted that the positions of the communication paths 215, 217 are shown for illustration purposes only and not to indicate any specific ways in which the internal HVIL system 204 is configured to communicate with other components or units of the HV component 200.

The internal HVIL system 204 as shown in FIG. 3 may be included in the HV component 200 that may be installed in a vehicle or other device employing either a centralized HVIL system or a de-centralized HVIL system.

Referring back to FIG. 2, it illustrates an example of the HV component 200 used in the centralized HVIL system, while the HV component 200 is in normal operating conditions i.e. no HVIL is present either on the HV component itself or someplace else, e.g. in another HV component, in the vehicle.

Figure 4:
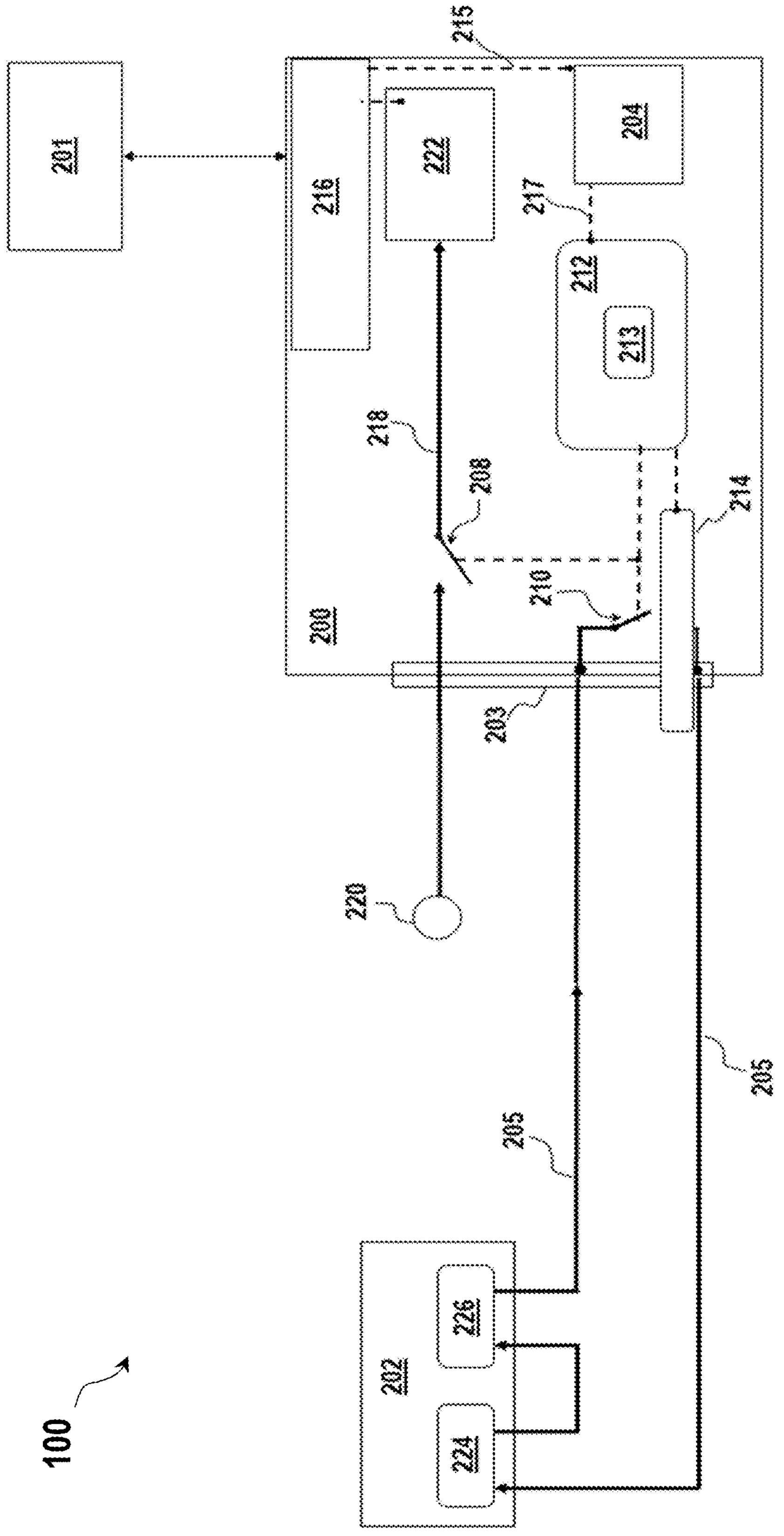
FIG. 4 is a block diagram illustrating an example of the HV component of FIG. 2, when an HVIL fault occurs in the HV component, in accordance with examples of the present disclosure.

FIG. 4 illustrates an example of the vehicle 100 comprising the HV component 200 and the vehicle ECU 202 when an HVIL fault, referred to as an internal HVIL fault, is present on the HV component 200.

The internal HVIL fault may be detected when a breach of continuity of the signal in the signal continuity detection circuit 228 of the internal HVIL system unit 204 is detected. This may occur when, e.g., an access point or component e.g. access component 233 (FIG. 3) is accessed e.g. opened, disconnected, or otherwise accessed to gain access to the HV component 200 during e.g. maintenance or repair. In some examples, an HVIL fault may occur during vehicle accidents or other circumstances in which the HV component 200 may be accessed not intentionally. In any case, the HVIL system is intended to protect persons from e.g. electrical arcing.

Responsive to the occurrence of the internal HVIL fault, the HVIL logic unit 212 may control the second relay element 210 to move, after a first delay period, to the open second relay element configuration to thereby inform the vehicle ECU 202 of the internal HVIL fault. Thus, in FIG. 4, the second relay element 210 is shown in the open configuration. The second relay element 210 may be triggered to open after a certain delay, referred to herein as the first delay period, relative to a time when the internal HVIL fault has occurred. The first delay period may be small, e.g. a few milliseconds in some examples. In some examples, the first delay period may be 10 milliseconds, as a non-limiting example.

Also responsive to the occurrence of the internal HVIL fault, the HVIL logic unit 212 may control the first relay element 208 to move, after a second delay period, to the open first relay element configuration to thereby disable the HV component 200. The second delay period may be longer than the first delay period, such that the first relay element 208 may be triggered to open later than the second relay element 210. When the internal HVIL fault is present on the HV component 200, the HV component 200 may be not immediately disabled, and/or not disabled as the second relay element 210 is disabled and the external HVIL system 206 is thus informed of the fault, but some time may be allowed to pass before the HV component 200 is disabled.

The second delay period may vary depending on various factors. For example, in some examples, the second delay period may depend on at least one of an operating state or mode of the vehicle and a type of the HV component. Thus, the second delay period may differ for different types of HV components and depending on the operating mode of the vehicle when the HVIL fault is detected. The operating mode of the vehicle may comprise, e.g., a standing mode i.e. the vehicle may be not moving, or a moving mode when the vehicle is moving. More than two vehicle operating modes may be defined. In some examples, when the operating mode of the vehicle comprises the standing mode, the second delay period may be shorter than when the operating mode of the vehicle comprises the moving mode. When the vehicle is standing and, e.g, a maintenance person is attempting to access the HV component 200, the second delay period may be selected so as to prevent electrical arcing for the HV component 200.

In some examples, when the vehicle including the HV component 200 is moving, the second delay period may be longer because some time may be required to allow for a safe deactivation or shutdown of the HV component 200.

Depending on functionality of the HV component 200, including its criticality for vehicle operation, the component 200 may be deactivated or disabled with a certain delay. It may in some cases take more than an hour, or even several hours, to shut down the HV component 200 when the vehicle is moving. For example, the vehicle will need to reach a safe destination after the internal HVIL fault is detected and before the HV component 200 can be shutdown. As an example, if the HVIL fault is detected on the brakes, they are not shutdown while the vehicle is moving.

The arcing may occur quite fast. Depending on particular circumstances, the arcing may not have the same risk. For example, if a technician is working on a vehicle while the vehicle is standing still, the arcing will be quite hazardous and it is required to avoid it. In such scenario, the relays will be opened with a minimum delay, such that the first, second and third delay periods may be minimum. However, in a scenario where the vehicle is moving, arcing may be considered to be less hazardous, as there may be no risk of injury to a person. Thus, the delay periods, e.g., the second and third delay periods, may be longer. In this way, the HV component is protected by not being disabled in an uncontrolled manner.

Figure 5:
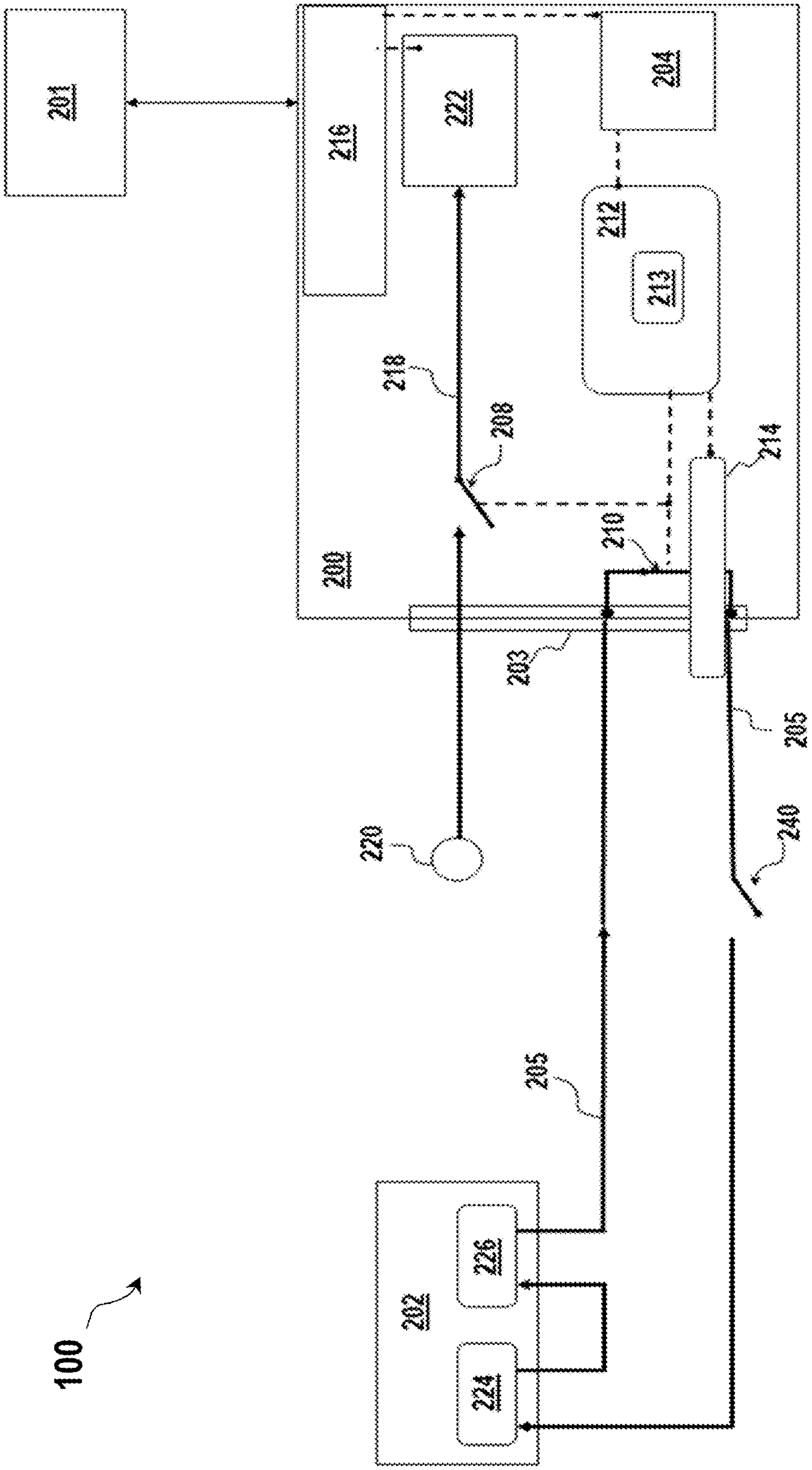
FIG. 5 is a block diagram illustrating an example of the HV component of FIG. 2, when an HVIL fault occurs in the centralized HVIL system outside of the HV component, in accordance with examples of the present disclosure.

FIG. 5 illustrates an example of the vehicle 100 comprising the HV component 200 and the vehicle ECU 202 when an external HVIL fault is present. As discussed above, the external HVIL fault, which occurs outside of the HV component 200, may be detected when a change in a value of the signal in the external HVIL signal communication path 205 is detected. For example, the signal detector 214 such as e.g. the current detector may detect the external HVIL fault when a value of the current in the external HVIL signal communication path 205 is zero. Thus, once an HVIL fault is triggered, the current in the external HVIL signal communication path 205, or a vehicle HVIL loop, becomes zero. The signal detector 214 communicates this information to the HVIL logic function 212 of the HV component 200. Depending on the situation, for example, whether the vehicle 100 is moving or standing still, the HVIL logic function 212 may control or trigger the first relay element 208 to open after a certain amount of time to disable the HV component.

As shown schematically in FIG. 5, the integrity of the signal in the external HVIL signal communication path 205 may be breached causing the flow of the current to be interrupted when the external HVIL fault is present on the external HVIL system 206. An element 240 is shown in FIG. 5 as being open to illustrate schematically that the external HVIL fault has occurred outside of the HV component 200. The signal detector 214 is configured to communicate information about the external HVIL fault, e.g. as an external HVIL fault signal, to the HVIL logic unit 212 of the HV component 200.

The HVIL logic unit 212 may control the first relay element 208 responsive to the external HVIL fault signal similarly to controlling the first relay element 208 when an internal HVIL fault is present on the HV component 200. Thus, in some examples, responsive to receiving, via the external HVIL signal communication path 205, the external HVIL fault signal informing the HVIL logic unit 212 of an external HVIL fault, the HVIL logic unit 212 controls the first relay element 208 to, after a third delay period, move to the open first relay element configuration to thereby disable the HV component. Thus, the third delay period may be selected to be similar to the second delay period. In some examples, the third delay period may depend on at least one of an operating mode of the vehicle and a type of the HV component 200. In some examples, when the operating mode of the vehicle comprises a standing mode, the third delay period may be shorter than when the operating mode of the vehicle comprises a moving mode. As discussed above, there may be a smaller or no risk of injury to a person when an HVIL fault occurs during the vehicle moving, and some delay in reactivity to the HVIL fault may be acceptable.

Delaying the shutdown of the HV component 200, responsive to the internal HVIL fault or the external HVIL fault, in accordance with examples of the present disclosure, referred to herein as a delayed reactivity, allows for a more flexible and adaptable control of operation of the HV component and of the entire vehicle, while ensuring safety for humans. Moreover, the delayed reaction to the HVIL fault may extend the lifetime of the HV component 200.

FIGS. 3, 4, and 5 illustrate examples of the HV component, in accordance with examples of the present disclosure, which is included in the vehicle employing a centralized HVIL system. In existing solutions, different types of HV components are used in a centralized HVIL system and in a de-centralized HVIL system, respectively. Thus, different parts need to be manufactured for vehicles using the centralized HVIL system and vehicles using the de-centralized HVIL system, respectively. This adds production times and costs.

The HV component and methods of use thereof in accordance with the present disclosure allow reducing a number of variants of an HV component because the same type of an HV component, i.e. the same hardware part, may be manufactured and used in either a centralized HVIL system or in a de-centralized HVIL system. The HV component configured in accordance with examples of the present disclosure may be reconfigured for use in a centralized HVIL system, e.g., in a vehicle employing the centralized HVIL system. The HV component may also be reconfigured for use in a de-centralized HVIL system, e.g., in a vehicle employing the de-centralized HVIL system. The same HV component may be interchangeably used in either of the HVIL systems. Furthermore, in some implementations, the HV component may be movable from a vehicle having a centralized HVIL system to a vehicle having a de-centralized HVIL system. The HV component may be movable from a vehicle having a de-centralized HVIL system to a vehicle having a centralized HVIL system. The HV component may be configured or reconfigured to fit a suitable HVIL system.

In some examples, the configuration or reconfiguration of the HV component may not involve reconfiguring any hardware components. Rather, depending on implementation of the HVIL logic unit, the reconfiguration may involve setting one or more parameters which may be implemented in software and/or firmware.

Figure 6:
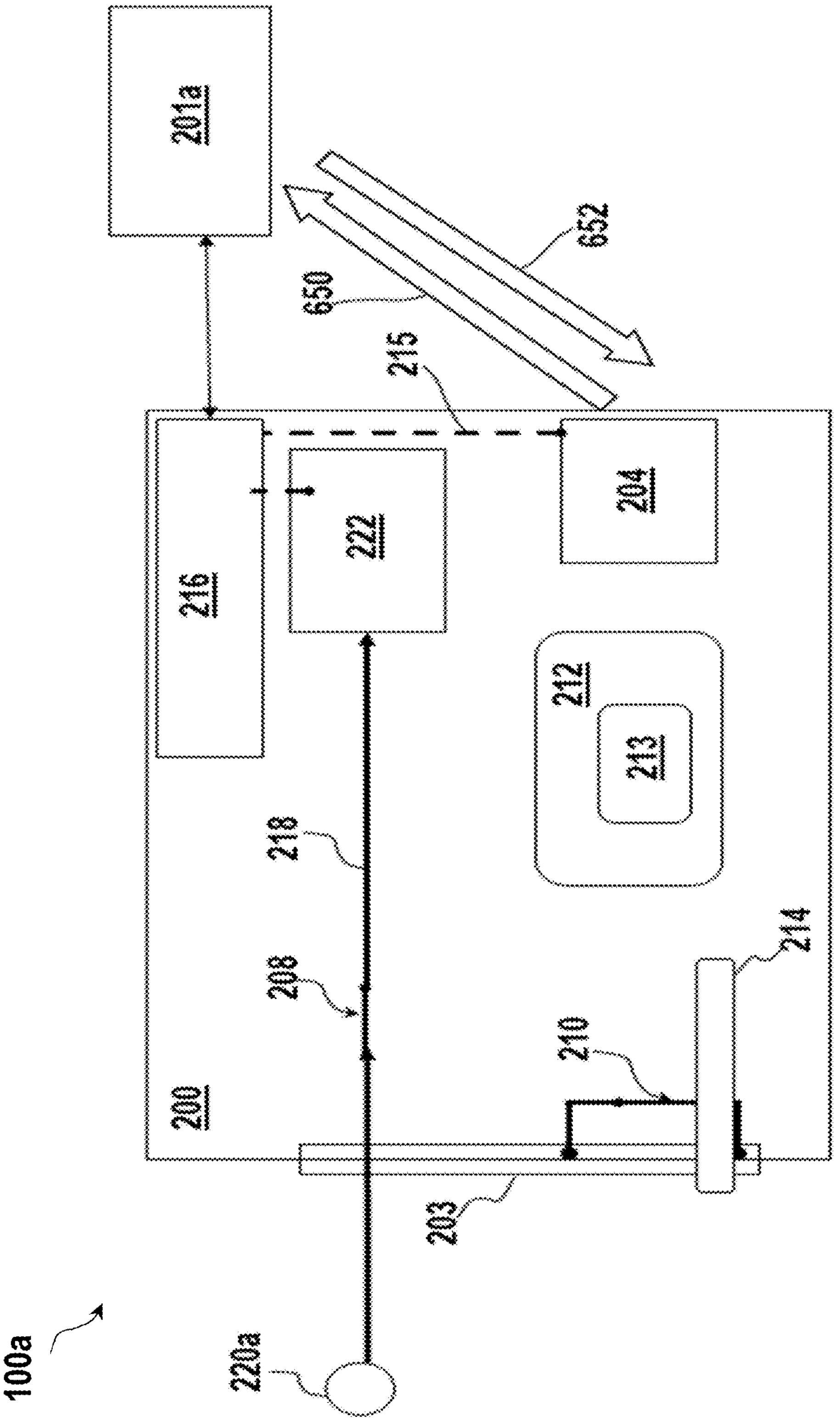
FIG. 6 is a block diagram illustrating an example of a vehicle comprising a HV component configured for a de-centralized HVIL system, in accordance with examples of the present disclosure.

FIG. 6 illustrates an example of a vehicle 100*a* employing a de-centralized HVIL system and comprising the HV component 200 that has been reconfigured to be installed in the de-centralized HVIL system. As shown in FIG. 6, the same HV component 200 that can be reconfigured or adjusted for use in the centralized HVIL system, as shown in FIGS. 2, 4, and 5, may be used in a de-centralized HVIL system. The vehicle 100*a* may be similar to vehicle 10*a* shown in FIG. 1B, though any type of vehicle, or another device, may use one or more HV components in a de-centralized HVIL system, in accordance with examples of the present disclosure.

The vehicle 100*a* comprises a vehicle main or master controller 201*a* which may be similar to vehicle master controller 201 of vehicle 100 shown in FIGS. 2, 4, and 5.

The HV component control unit 216 is configured to communicate with the vehicle master controller 201*a* via e.g. a CAN, ethernet and/or another type of a communications network. The HV component control unit 216 is configured to communicate with the internal HVIL system unit 204, as shown schematically in FIG. 6 by a dotted line representing a communication path 215 between the HV component control unit 216 and the internal HVIL system unit 204.

The vehicle 100*a* may not include a vehicle ECU similar to vehicle ECU 202 shown in FIGS. 2, 4, and 5, because such an ECU, configured to control operation of an external HVIL system, is not used in a vehicle with a de-centralized HVIL system.

The HVIL logic unit 212 may be inactivated or disabled or otherwise made non-functional in the vehicle 100*a*, such that at least the HVIL fault response control function 213 is inactivated or disabled. It may also be said that a control logic, that the HVIL fault response control function 213 is configured to implement, is suppressed. The second relay element 210 is disabled because, in the de-centralized HVIL system, an internal HVIL fault is not communicated outside of the HV component 200 in the same manner as in a centralized HVIL system. The first relay element 208 may also be disabled, e.g., it may be a normally closed (n.c.) relay.

In some implementations, the first relay element 208 may be operative, but it is not controlled by the HVIL fault response control function 213 that is disabled, but the first relay element 208 may be controlled in another way and using another component or unit. Thus, the HV component control unit 216 and/or the internal HVIL system unit 204 may control whether the HV component 200 is enabled or disabled, which is performed in response to instructions from the vehicle 100*a*. As shown in FIG. 6, the first relay element 208 may be positioned in a communication path 218 between a power supply 220*a*, e.g., a low voltage power supply, and the HV enable logic unit 222. In implementation in which the first relay element 208 is operative or functional, it may be controlled to thereby control the HV enable logic unit 222 to enable the HV component 200 or allow the HV component 200 to continue operating, or to disable the HV component 200.

In some implementations of the de-centralized HVIL system, the HV component 200 may be configured to be enabled or disabled in ways other than using the first relay element 208.

In examples in which the HVIL logic unit 212 is completely disabled, the HV component control unit 216 and/or the internal HVIL system unit 204 may inform the vehicle 100*a*, e.g. the vehicle main controller 201*a*, of an occurrence of an internal HVIL fault if such fault is detected by the internal HVIL system unit 204, e.g. as an internal HVIL fault signal. As shown schematically in FIG. 6 by an arrow 650, a message informing the vehicle master controller 201*a* of the internal HVIL fault signal may be sent by the internal HVIL system unit 204 or by the HV component control unit 216. The HV component control unit 216 and/or internal HVIL system unit 204 are configured to receive, in response to the message, a command or instruction from the vehicle master controller 201*a*, regarding an action responsive to the internal HVIL fault signal, as shown schematically in FIG. 6 by an arrow 652. For example, the vehicle master controller 201*a* may instruct the HV component control unit 216 and/or internal HVIL system unit 204 to shut down the HV component 200.

In some examples, the HVIL fault response control function 213 may be inactivated or disabled whereas one or more other functions of the HVIL logic unit 212 may remain active. For example, the HVIL logic unit 212 may take part in controlling the HV component 200 to be enabled or disabled. In some implementations, the HVIL logic unit 212 may be included in the HV component control unit 216, and the HVIL logic unit 212 may take part in controlling the HV component 200 to be enabled or disabled. In addition or alternatively, with the HVIL fault response control function 213 being inactivated or disabled, the HVIL logic unit 212 may be configured to send messages to the vehicle master controller 201*a* thereby informing the vehicle master controller 201*a* of the internal HVIL fault.

In a de-centralized HVIL system which may be used e.g. in an electric or hybrid vehicle, or in another device or system, one or more HV components may each report occurrences of internal HVIL faults on these components to a vehicle main controller. The vehicle main controller may determine whether to disable or shutdown a particular HV component and may instruct the HV component accordingly.

Figure 7:
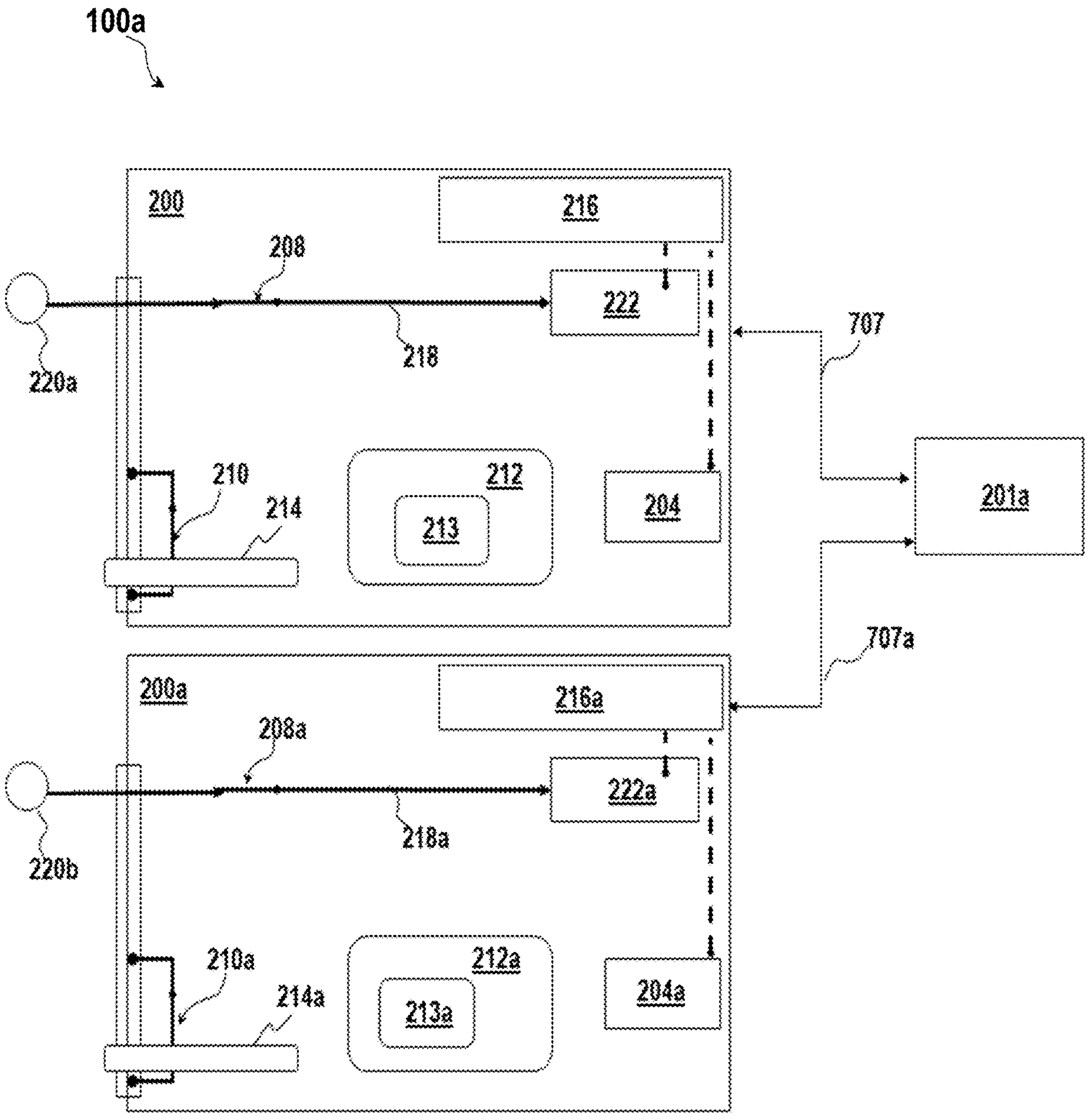
FIG. 7 is a block diagram illustrating an example of a vehicle comprising two HV components configured for a de-centralized HVIL system, in accordance with examples of the present disclosure.

FIG. 7 illustrates that, in a de-centralized HVIL system of vehicle 100*a*, HV components report internal HVIL faults to a vehicle master controller and receive instructions from the vehicle master controller regarding actions in response to the internal HVIL faults. Thus, FIG. 7 illustrates the HV component 200 also shown in FIGS. 2-6 herein, and additionally illustrates a second HV component 200*a* which may be similar to HV component 200. It should be appreciated however that the HV components 200, 200*a* may be of different types and that they are shown schematically herein.

Similar to the HV component 200 shown in FIGS. 2-6 which may be referred to as a first HV component 200, the second HV component 200*a* comprises an HVIL system unit 204*a*; first and second relay elements 208*a*, 210*a* which are disabled in the example shown in FIG. 7; a current detector 214*a*; an HVIL logic unit 212*a* which is disabled entirely or partially e.g. its HVIL fault response control function 213*a* may be disabled; an HV component control unit 216*a*; and an HV enable logic unit 222*a*. Similar to the example of the HV component 200 shown in FIG. 6 and also shown in FIG. 7, the first relay element 208*a* may be operational in some implementations of the second HV component 200*a*. As shown in FIG. 7, the first relay element 208*a* may be positioned in a communication path 218*a* between a power supply 220*b*, e.g., a low voltage power supply, and the HV enable logic unit 222*a*.

The description of the units of the second HV component 200*a* shown in FIG. 7 is not repeated for the sake of brevity, as the description of units labeled using similar numerical references, in connection with the first HV component 200 also shown in FIGS. 2-6, applies to the respective units of the second HV component 200*a*. The second HV component 200*a* may comprise other components or units not shown in FIG. 7.

It should be noted that, in the HV component 200 shown in FIGS. 6 and 7, communications lines or paths may be present between the components or units, e.g., between the signal detector 214 and the HVIL logic unit 212, between the HVIL logic unit 212 and the internal HVIL system unit 204, and/or between other components or units of the HV component 200. These paths are not shown in FIGS. 6 and 7 for the sake of simplicity of representation, and it should be understood that the implementation of the HV component 200 in accordance with examples of the present disclosure is not limited to its representation in the Figures. Similarly, communications lines or paths may be present between the components or units of the second HV component 200*a* shown in FIG. 7.

As shown in FIG. 7, each of the first HV component 200 and the second HV component 200*a* may communicate with the vehicle master controller 201*a* to inform the vehicle master controller 201*a* of respective HVIL faults and to receive commands or instructions from the vehicle master controller 201*a* regarding actions to take in response to the HVIL faults. For example, the internal HVIL system unit 204 and the HV component control unit 216 of the first HV component 200 may communicate with the vehicle main controller 201*a*, as schematically shown in FIG. 7 by an arrow 707. Similarly, the internal HVIL system unit 204*a* and the HV component control unit 216*a* of the second HV component 200*a* may communicate with the vehicle main controller 201*a*, as schematically shown by an arrow 707*a* in FIG. 7. Other components or units of the first and second HV components 200, 200*a* may communicate with the vehicle main controller 201*a*.

It should be appreciated that two HV components, configured to communicate with the vehicle master controller 201*a*, are shown for illustration purposes only, as more than two HV components may communicate occurrences of respective HVIL faults to the vehicle main or master controller 201*a* via e.g. CAN, ethernet, or another connection or communications network. The vehicle 100*a* may comprise multiple HV components operating in the de-centralized HVIL system.

In examples in accordance with the present disclosure, the HV component is reconfigurable to be included in a centralized HVIL system and/or is reconfigurable to be included in a de-centralized HVIL system. This advantageously allows manufacturing a modular, reconfigurable HV or traction voltage device or component that may be used in either a vehicle with a centralized HVIL system or a vehicle with a de-centralized HVIL system. Thus, a need to manufacture at least two types, e.g., two part numbers, of an HV component may be eliminated, which reduces manufacturing time and costs. Moreover, a reconfigurable HV component may be easier to install, maintain, and repair, which further improves vehicle manufacturing and maintenance process.

Those skilled in the art will appreciate that units of the HV component in accordance with examples herein may refer to a combination of analogue and digital circuits, and/or one or more processors configured with software and/or firmware, e.g., stored in the units, that, when executed by the respective one or more processors, may perform the methods in accordance with examples of the present disclosure. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip.

In some aspects, examples of the present disclosure provide an HV component assembly for a vehicle, the HV component assembly comprising at least one HV component configured in accordance with examples of the present disclosure. The HV component assembly may comprise one or more HV components. For example, the HV component assembly may comprise two or more HV components 200 as shown e.g. in FIGS. 1A, 2, 3, 4, and 5. The HV components 200 may be different types of components for the vehicle. For example, the HV components 200 may comprise a fuel cell system, an energy storage system such as e.g. a battery, brakes, an air conditioner, and/or any other types of vehicle HV components.

In some examples, the HV component assembly may comprise an external signal continuity detection system configured to be communicatively coupled, via an external HVIL signal communication path, to a corresponding HVIL logic unit of each of the at least one HV component, whereby an HVIL fault on any HV component of the at least one HV component is communicated to all other HV components of the at least one HV component. The external signal continuity detection system may comprise and/or may be configured to be coupled to one or more external HVIL signal communication paths that each includes or is associated with a signal detector configured to monitor and detect a value of the signal in the external HVIL signal communication path. For example, as described for the HV component 200 that may be reconfigured for installation in a centralized HVIL system, the signal detector 214 may be configured to monitor a signal in the external HVIL signal communication path 205. The signal detector 214 is configured, if an external HVIL fault occurs, to communicate information about the external HVIL fault, e.g. as an external HVIL fault signal, to the HVIL logic unit 212 of the HV component 200. The vehicle ECU 202 may comprise and/or control the external signal continuity detection system.

In some aspects, a vehicle is provided comprising at least one HV component configured in accordance with examples of the present disclosure. The vehicle may be any vehicle configured to employ an HVIL system configured to monitor integrity of a high-power or high-voltage system in the vehicle. In some examples, the vehicle may be a FCEV.

In some aspects, examples of the present disclosure provide a vehicle comprising a HV component assembly in accordance with examples of the present disclosure. The vehicle may be any vehicle configured to employ an HVIL system configured to monitor integrity of a high-power or high-voltage system in the vehicle.

In some aspects, examples of the present disclosure provide a method for configuring a HV component for a vehicle, the HV component comprising an internal HVIL system unit configured to detect an internal HVIL fault and to output information on the internal HVIL fault as an internal HVIL fault signal.

Non-limiting examples of a vehicle comprising a centralized HVIL system are shown in FIGS. 1A, 2, 4, and 5.

The method comprises configuring the HV component so as to enable an HVIL fault response control function of an HVIL logic unit of the HV component, wherein the HVIL logic unit is configured to be enabled or at least partially disabled. The HV component further comprises a first relay element configured to move from a closed first relay element configuration to an open first relay element configuration to thereby disable the HV component; and a second relay element configured to be positioned in an external HVIL signal communication path that is connectable to an external HVIL system, the second relay element being configured to move from a closed second relay element configuration to an open second relay element configuration to thereby inform a vehicle ECU of the internal HVIL fault. The enabling of the HVIL fault response control function causes the HVIL logic unit to be able to, responsive to receiving the internal HVIL fault signal from the HVIL system unit, after a first delay period, control the second relay element to move to the open second relay element configuration to thereby inform the vehicle ECU of the internal HVIL fault and, after a second delay period, control the first relay element to move to the open first relay element configuration to thereby disable the HV component; and, responsive to receiving, via the external HVIL signal communication path, an external HVIL fault signal informing the HVIL logic unit of an external HVIL fault, after a third delay period, control the first relay element to move to the open first relay element configuration to thereby disable the HV component.

In some aspects, examples of the present disclosure provide another method for configuring a HV component for a vehicle. Non-limiting examples of the vehicle comprising a de-centralized HVIL system are shown in FIGS. 1B, 6, and 7. The HV component comprises an internal HVIL system unit configured to detect an internal HVIL fault and to output information on the internal HVIL fault as an internal HVIL fault signal. The method comprises configuring the HV component so as to disable an HVIL fault response control function of an HVIL logic of the HV component. The HVIL logic unit is configured to be enabled or at least partially disabled. The HV component further comprises a first relay element configured to move from a closed first relay element configuration to an open first relay element configuration to thereby disable the HV component; and a second relay element configured to be positioned in an external HVIL signal communication path that is connectable to an external HVIL system, the second relay element being configured to move from a closed second relay element configuration to an open second relay element configuration to thereby inform a vehicle ECU of the internal HVIL fault.

In some examples, the HV component may be configured to, when the HVIL logic unit is completely or partially disabled, generate and send, to a vehicle master controller of the vehicle, a message informing the vehicle master controller of the internal HVIL fault signal; and receive, in response to the message, an instruction from the vehicle master controller, regarding an action responsive to the internal HVIL fault signal. The instruction may comprise, for example, an instruction to disable or shutdown the HV component.

In some examples, a method is provided that further comprises removing the HV component from a vehicle employing a centralized HVIL system, reconfiguring the HV component to be suitable for a de-centralized HVIL system, and installing the reconfigured HV component on a vehicle with the de-centralized HVIL system.

In some examples, a method is provided that further comprises removing the HV component from a vehicle employing a de-centralized HVIL system, reconfiguring the HV component to be suitable for a centralized HVIL system, and installing the reconfigured HV component on a vehicle with the centralized HVIL system.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A high-voltage, HV, component for a vehicle, comprising:

an internal Hazardous Voltage Interlock Loop, HVIL, system unit comprising a signal continuity detection circuit and configured to detect a breach of continuity of a signal in the signal continuity detection circuit as an internal HVIL fault and to output information on the internal HVIL fault as an internal HVIL fault signal;

a first relay element configured to move from a closed first relay element configuration to an open first relay element configuration to thereby disable the HV component;

a second relay element configured to be positioned in an external HVIL signal communication path that is connectable to an external HVIL system, the second relay element being configured to move from a closed second relay element configuration to an open second relay element configuration to thereby inform a vehicle electronic control unit, ECU, of the internal HVIL fault; and an HVIL logic unit that comprises an HVIL fault response control function and is configured to be enabled or at least partially disabled, and configured to, when enabled, use the HVIL fault response control function to:

responsive to receiving the internal HVIL fault signal from the HVIL system unit, after a first delay period, control the second relay element to move to the open second relay element configuration to thereby inform the vehicle ECU of the internal HVIL fault and, after a second delay period, control the first relay element to move to the open first relay element configuration to thereby disable the HV component; and responsive to receiving, via the external HVIL signal communication path, an external HVIL fault signal informing the HVIL logic unit of an external HVIL fault, after a third delay period, control the first relay element to move to the open first relay element configuration to thereby disable the HV component.

2. The HV component of claim 1, wherein the second delay period depends on at least one of an operating mode of the vehicle and a type of the HV component.

3. The HV component of claim 2, wherein, when the operating mode of the vehicle comprises a standing mode, the second delay period is shorter than when the operating mode of the vehicle comprises a moving mode.

4. The HV component of claim 1, wherein the second delay period is longer than the first delay period.

5. The HV component of claim 1, wherein the third delay period depends on at least one of an operating mode of the vehicle and a type of the HV component.

6. The HV component of claim 5, wherein, when the operating mode of the vehicle comprises a standing mode, the third delay period is shorter than when the operating mode of the vehicle comprises a moving mode.

7. The HV component of claim 1, comprising an HV component control unit that is configured to, when the HVIL logic unit is completely or partially disabled, generate and send, to a vehicle master controller of the vehicle, a message informing the vehicle master controller of the internal HVIL fault signal.

8. The HV component of claim 7, wherein the HV component control unit is configured to receive, in response to the message, an instruction from the vehicle master controller, regarding an action responsive to the internal HVIL fault signal.

9. The HV component of claim 1, comprising a first signal detector configured to be coupled to the external HVIL signal communication path to detect the external HVIL fault and to provide the external HVIL fault signal to the HVIL logic unit of the HV component.

10. The HV component of claim 1, wherein the HV component is reconfigurable to be included in a centralized HVIL system and reconfigurable to be included in a decentralized HVIL system, wherein the HVIL logic unit is enabled when the HV component is reconfigured to be connected to the centralized HVIL system and the HVIL logic unit is partially or completely disabled when the HV component is reconfigured to be connected to the decentralized HVIL system.

11. The HV component of claim 1, wherein the HV component comprises a fuel cell system.

12. A high-voltage, HV, component assembly for a vehicle, the HV component assembly comprising at least one HV component of claim 1.

13. The HV component assembly of claim 12, comprising an external Hazardous Voltage Interlock Loop, HVIL, system comprising an external signal continuity detection system configured to be communicatively coupled, via an external HVIL signal communication path, to a corresponding HVIL logic unit of each of the at least one HV component, whereby an HVIL fault on any HV component of the at least one HV component is communicated to all other HV components of the at least one HV component.

14. A vehicle comprising at least one HV component of claim 1.

15. A vehicle comprising a HV component assembly of claim 12.

16. A method for configuring a high-voltage, HV, component for a vehicle, the HV component comprising an internal Hazardous Voltage Interlock Loop, HVIL, system unit configured to detect an internal HVIL fault and to output information on the internal HVIL fault as an internal HVIL fault signal, the method comprising:

configuring the HV component so as to enable an HVIL fault response control function of an HVIL logic unit of the HV component, wherein the HVIL logic unit is configured to be enabled or at least partially disabled;

wherein the HV component further comprises:

a first relay element configured to move from a closed first relay element configuration to an open first relay element configuration to thereby disable the HV component; and a second relay element configured to be positioned in an external HVIL signal communication path that is connectable to an external HVIL system, the second relay element being configured to move from a closed second relay element configuration to an open second relay element configuration to thereby inform a vehicle electronic control unit, ECU, of the internal HVIL fault; and wherein the enabling of the HVIL fault response control function causes the HVIL logic unit to be able to:

responsive to receiving the internal HVIL fault signal from the HVIL system unit, after a first delay period, control the second relay element to move to the open second relay element configuration to thereby inform the vehicle ECU of the internal HVIL fault and, after a second delay period, control the first relay element to move to the open first relay element configuration to thereby disable the HV component; and responsive to receiving, via the external HVIL signal communication path, an external HVIL fault signal informing the HVIL logic unit of an external HVIL fault, after a third delay period, control the first relay element to move to the open first relay element configuration to thereby disable the HV component.

* * * * *